Feb. 9, 1954   H. OESTRICH ET AL   2,668,585
FUEL FEED CONTROL FOR GAS TURBINE ENGINES
Filed July 27, 1948
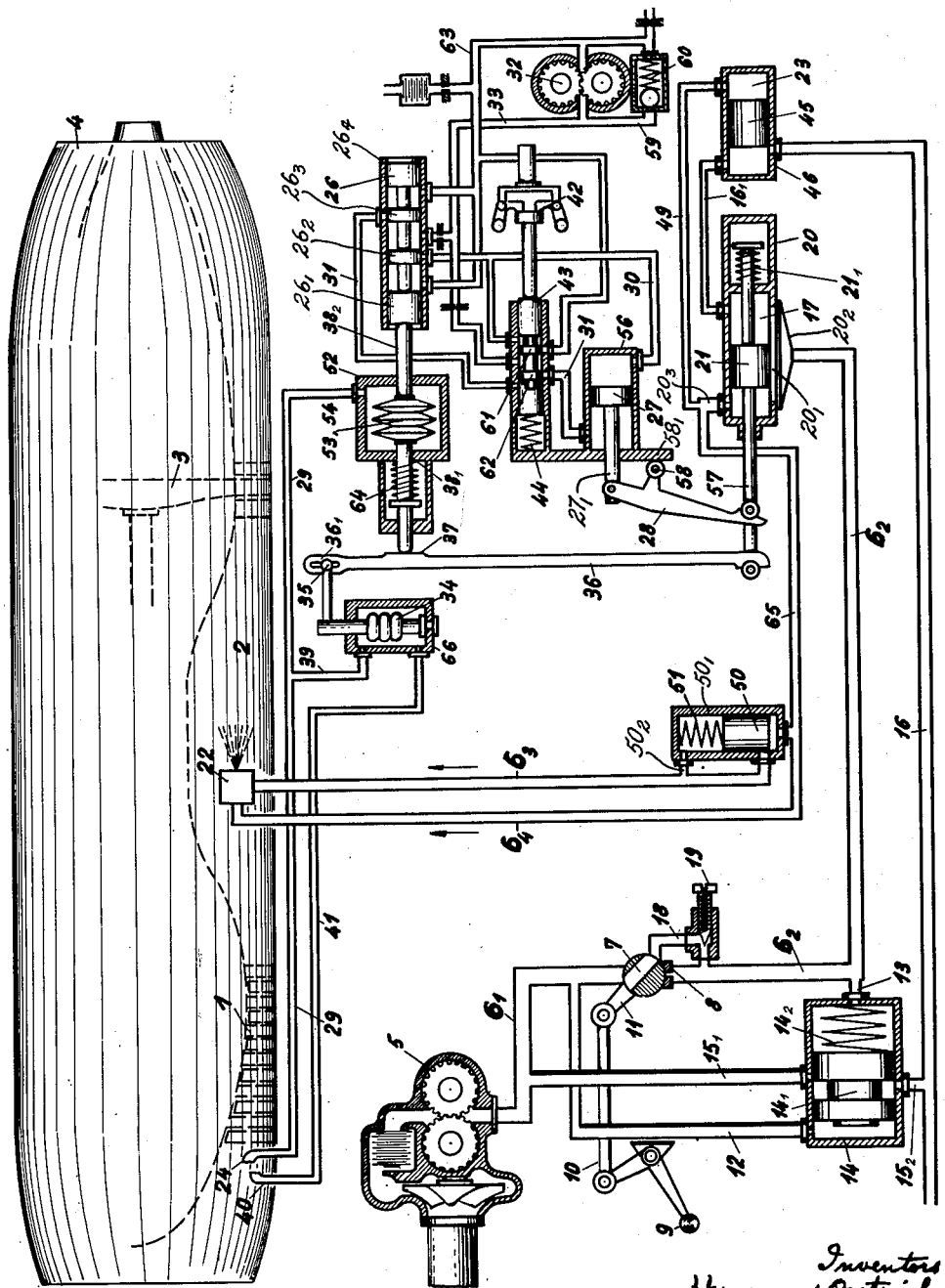
Inventors
Hermann Oestrich
Siegfried Decker
Wolfgang Stein
by Stevens Davis Miller + Mosher
their attorneys Patented Feb. 9, 1954

2,668,585

UNITED STATES PATENT OFFICE 2,668,585

FUEL FEED CONTROL FOR GAS TURBINE ENGINES

Hermann Oestrich, Siegfried Decher, and Wolfgang Stein, Decize, France; said Decher and said Stein assignors to said Oestrich Application July 27, 1948, Serial No. 40,954

Claims priority, application France August 4, 1947

7 Claims. (Cl. 158—36)

A gas-turbine used as an aircraft engine requires a regulation which should take into account peculiar conditions of the aircraft's flight, particularly the variable characteristics of the air admitted at the inlet of the engine, through the air intake.

These characteristics of the air admitted especially depend on the flight speed of the plane, on altitude, and also on the differences between said air and the International Standard Atmosphere indicated by the abbreviation I. N. A.

In order to obtain a maximum efficiency, and maximum life, for the turbine, such a regulation should be effected in order that the component parts of the engine which are stressed to a maximum extent at the wide open position of the throttle are equally stressed irrespectively of the altitude and flight speed. Such a process of regulation will thus prevent any overstress for the engine component parts.

In order to solve this problem of regulation, it is desirable to keep constant, during full-throttle running, a given number of revolutions and gas temperature, whatever be the conditions of flight which the plane may meet. In the known jet propulsion engines, this result is obtained by modifying, according to the altitude and the flight speed, the quantity of fuel brought to the nozzles, and also the cross-section of the jet nozzle receiving the exhaust discharge from the engine. In turbine driven propeller units, the regulation is effected by altering the propeller pitch, instead of adjusting the exhaust jet nozzle.

A primary object of our invention is to provide engine control means which are relatively simple and easily applicable to various types of jet engines.

This invention relates to means for the control of jet engines such as turbojet engines and propjet engines, through which fuel is supplied to the engine by the required amount for securing a constant temperature in the combustion chamber and a constant R. P. M. for said engine at full-throttle running, irrespectively of the actual conditions of air admitted to the engine.

Furthermore this invention relates to means for the control of jet engines such as turbojet engines and propjet engines, through which the required amount of fuel supplied to the engine is adjusted in dependence of the temperature and pressure of air at a point upstream with respect to the compressor inlet so that simultaneously the static characteristics of the outside air, the altitude and the flight speed of the plane can be taken into account.

According to a modification of the invention, the regulation of the amount of fuel sent to the engine is combined with a regulation of propulsion means as a function of the rotation speed of the engine in order to keep this rotation speed at a constant value.

According to another characteristic of the invention, the amount of fuel to be fed to the engine is regulated by determining the maximum amount of fuel for feeding this engine at full-throttle running and in the atmospheric conditions of high speed, low altitude and great cold flights, supplying said amount to the fuel supply line for the engine, and causing only that portion thereof which is actually required under the prevailing conditions, to be forwarded to the engine while withdrawing the remainder from said line.

The invention is also relative to an arrangement for carrying into practice the preceding, or similar processes, characterized by means for adjusting the amount of fuel supplied to the engine, which are controlled from a heat expansible device responsive to the temperature of air at the intake for the compressor and a pressure deformable device responsive to the absolute pressure of said air.

According to a feature of the invention, the fuel-system includes, before the fuel control device, manually operable means for adjusting the rate of flow therethrough to values between zero and the maximum amount of supply to the engine as above defined, according to the desired power output.

The invention finally includes the features described below and their various possible combinations.

An arrangement of the engine control means according to the invention is shown, as an example, on the attached drawing, on which the sole figure is a diagrammatic general view of the adjusting device according to the invention, adapted to a jet propulsion engine.

The structure of the control means according to the invention is based on the following considerations:

The amount of fuel necessary, during the full-throttle running and in order to keep constant the temperature in the combustion chamber and the number of revolutions depends on the variable characteristics of the air before the compressor.

With all turbojet engines and turboprop engines, if B is the total amount of fuel supplied to the combustion engine, $b$ is the amount of unburnt fuel, $p_1$ is the absolute pressure at the inlet to the compressor and $T_1$ is the absolute temperature at said inlet, we have found that the amount of fuel actually burnt in the engine, viz. $B-b$, is proportional to $p_1$ and to a function of $T_1$. The function of $T_1$ is not strictly the same with all types of engines but the differences are not very important. We have found that for practical purposes the amount of fuel supplied the engine may be considered as substantially corresponding to the formula:

$$B = \beta_{p_1}[1 + \tau(288 - T_1)] + b$$

in which:

$\beta$=theoretical amount of fuel for the full-throttle running when $p_1=1$ atm. and $T_1=288°$
$\tau$=temperature coefficient (approximately constant for any engine).

The above formula shows, as above mentioned, that $B-b$ is proportional both to $p_1$ and to (a constant $-T_1$).

It is known that the density of air is proportional to $p_1/T_1$. If a graph is made with $T_1$ as abscissae, and the variations of $B-b$ for any constant pressure $p_1$ and a given turbine engine—as ordinates, it will be seen that it is possible to find a straight line of the type proportional to (a constant $-T_1$), which will practically correspond with a very good approximation to the variations of $B-b$. If the above mentioned line of the type proportional to (a constant $-T_1$) is to be compared with a line proportional to $1/T_1$ (the comparison being made of course on the same scale basis, in the sense that for the same value of normal temperature $T_1$ the corresponding point on the two lines should yield the same value) it will be seen that the corresponding curves are different, the curve corresponding to (a constant $-T_1$) being appreciably steeper than the curve corresponding to $1/T_1$. Hence it may be said that the influence of air temperature $T_1$ on the amount of fuel $B-b$ corresponding to the above formula is greater than if the amount of fuel were supplied in proportion to $1/T_1$. As a consequence we found it impossible to effect an automatic regulation of the fuel amount supplied to the burner in dependence on air density with a view to delivering fuel in accordance with our formula. We found it necessary to provide separate air temperature and air responsive devices, and to provide a suitable linkage for interconnecting said devices and the throttling member designed to control the fuel metering orifice.

With control means according to this invention, the amount of fuel corresponding to the ideal conditions is fed into the combustion chamber, so that, at full throttle, the number of revolutions and the temperature of the combustion chamber remain constant whatever the flight conditions may be. The measure of the necessary amount of fuel is obtained here only by taking into account the absolute pressure and the temperature of the air sucked in at the intake of the compressor, these two quantities being used as a basis for the adjustment of this amount of fuel.

According to a form of the invention, the regulation by modifying the cross-section of the exhaust nozzle is given up, the regulation being only obtained in modifying the amount of fuel fed to the injection jets and in distributing this fuel according to the amount computed for the ideal case.

In that case, it is desirable to design a safety device preventing the number of revolutions from exceeding a predetermined limit.

According to a variant of the invention, it will be possible to combine the fuel control means as above referred to with known means for adjusting the propelling device as a function of the R. P. M. of the engine so as to keep said R. P. M. constant; a speed governor driven from the engine is employed for that purpose.

In the case of a fixed exhaust nozzle, the structure of the fuel control means characterizing the invention is based on the following facts:

When an amount of fuel corresponding to the ideal case is injected in a jet propulsion engine including a fixed exhaust nozzle, the required values for the number of revolutions and the gas temperature are obtained only if the cross-section of the exhaust nozzle corresponds, by chance, to that which is suitable for the case considered, but if the cross-section of the exhaust nozzle is larger than that of the optimum nozzle, the number of revolutions and the air supply to the engine are superior to the required values.

As, by supposition, the amount of injected fuel remains the same, the result is a decrease of the gas temperature.

When, on the contrary, the exhaust nozzle has dimensions, and specially a section of passage inferior to those of the theoretical optimum nozzle, the rotation speed and the air supply to the engine are inferior to the theoretical values and the gas temperature is superior to the theoretical value.

In that case, the thrust given by the motor is not very different from the theoretical value obtained with a constant number of revolutions and a constant gas temperature, because it is known that in turbo-jet engines, the fuel consumption per unit of power remains substantially constant for changes of regulating conditions having little importance.

In other words, in the case where the inner cross-section of the exhaust nozzle is fixed to the value required for average flight conditions, and the amount of injected fuel corresponds to the ideal in each flight condition, a positive deviation of the number of revolutions of the engine will have as a consequence a negative deviation of the gas temperature and vice versa.

Considering that more often than not the blading of the turbine is the most stressed part of the unit, it will be understood that the feature described above (to wit, positive deviation of the R. P. M. corresponding to a negative deviation of gas temperature and vice versa) for a unit having a fixed exhaust nozzle and fuel supply control means in accordance with this invention, is favourable to a substantially invariable stressing of the turbine blades since any increase of centrifugal forces is compensated for by a decrease of heat effects and conversely.

In the case where the exhaust nozzles are not adjustable, the unavoidable variations of the number of revolutions of the engine and of the gas temperature can generally be maintained within acceptable limits, these variations being then without notable influence on the propulsion force developed by the jet propulsion engine.

Consequently the control means according to the invention require, for being carried into practice, the following essential elements:

In all cases, a device for regulating the amount of fuel.

In the case of turbojet units, sometimes a safety device permitting to limit the number of revolutions.

The fuel supply control device should feed the engine with an amount of fuel B given by the equation already given:

$$B = \beta_{p_1}[1 + r(288 - T_1)] + b$$

If the amount of unburnt fuel $b$ is not taken into account, the amount of fuel to be provided B is in direct ratio with—

(a) The absolute pressure $p_1$ in the intake to the compressor, which can be caused to act on deformable evacuated capsules to effect control, (b) The linear term relative to temperature. This term can be given by a temperature recorder sensitive to expansion.

It is the action of these two terms (a) and (b) which, after being multiplied, is transmitted to the device regulating the amount of fuel.

On the drawing is shown diagrammatically a regulating arrangement for carrying this invention into practice.

The turbojet unit is enclosed in a shell or casing shown at the top part of the figure, and the outline of the lower half of said unit is partly indicated by dotted lines; the main component parts of the unit comprise a compressor 1, a combustion chamber 2 containing fuel injection nozzles or jets 22, a turbine 3 keyed to the same shaft as the compressor, and a non-adjustable exhaust nozzle 4.

According to the invention, this engine is combined with means for controlling the supply of fuel to nozzles 22 which include the following parts:

(a) *Hand controlled fuel regulating device*

A fuel feed unit comprising pumps and a filter between the same, generally denoted 5, is provided to forward fuel through a conduit $6_1$ to a valve 7 operated by hand by an operating lever 9, a connecting rod 10 and a crank 11.

The valve 7 comprised for instance of a plug having a fuel passageway therethrough and rotating in a shell can feed the fuel, according to its position, either in a conduit $6_2$ having at its inlet a measuring orifice 8, either in a by-pass 18 turning round this orifice 8 and provided with a flow control device such as a screw-threaded needle valve 19. This by-pass is used for running without load.

The head loss of the fuel flow, produced when passing through orifice 8, results in a difference of pressure between the parts of the conduit above and below the orifice 8. Interposed between the fuel delivery conduit $6_1$ from the fuel feed unit 5 and a fuel conduit 16 is a valve casing 14 with a fuel supply branch pipe $15_1$ from conduit $6_1$ to said casing and a fuel discharge pipe $15_2$ from casing 14 to return conduit 16. Slidably movable in casing 14 to control the ports therein communicating with pipes $15_1$ and $15_2$ is a piston $14_1$, a spring $14_2$ being interposed between said piston $14_1$ and casing 14. Pipes 12 and 13 are interposed between conduits $6_1$, $6_2$ respectively and the opposite end chambers in valve casing 14 as shown. As the output of fuel feed unit 5 is higher than that which will be adjusted by orifice 8, an increasing fuel pressure prevails above this orifice. When this pressure reaches a value high enough for overcoming the strength of spring $14_2$ and thus moving piston $14_1$ to the right, said piston allows for discharge of fuel into the exhaust conduit $15_2$, which decreases the pressure above orifice 8.

For any given position of valve 7, a constant amount of fuel is thus fed through orifice 8 and conduit $6_2$ to a fuel feed control apparatus 17 to be described later on. When valve 7 is turned to fully open position, the constant amount of fuel corresponds to the needs of the jet propulsion engine, at full throttle running, at maximum speed and in the atmospheric conditions of high speed, low altitude and great cold flights.

(b) *Means for controlling the fuel feed*

The fuel feed control apparatus 17 includes a piston valve 21 arranged for sliding movement in a cylinder 20 and subjected to the action of spring $21_1$. Provided lengthwise in cylinder 20 is an elongated slot $20_1$ through the wall thereof, the fuel delivery conduit $6_2$ opening into a funnel-shaped member $20_2$ as shown, which extends throughout the length of slot $20_1$. Substantially in the same cross planes as the ends of slot $20_1$ are ports through the wall of cylinder 20, for delivering fuel into an exhaust pipe $16_1$ and a fuel main $20_3$. Piston valve 21 as shown has a considerably less axial extent than slot $20_1$ so that passageways for fuel through slot $20_1$ into the cylinder inner spaces on either side of piston valve 21 are available, but it will be readily understood that the rates of fuel supply to said spaces and thence to exhaust pipe $16_1$ and $20_3$ respectively vary differentially in accordance with the actual position of piston valve 21 in cylinder 20.

The exhaust pipe $16_1$ leads to a port through an end portion of a valve cylinder 46 which is a part of a compensating device generally referenced 23.

Arranged for slidable movement in cylinder 46 is a piston valve 45 adapted to establish or cut-off communication of that space of said cylinder to which exhaust pipe $16_1$ leads, with the fuel return pipe 16 above referred to. Branched off main $20_3$ is a pipe 49 leading to the space in cylinder 46 on the other side of piston 45.

Assuming that piston valve 21 is moved to the left and thus causes a restriction in the rate of fuel delivery to main $20_3$ with a consequent increase of the rate of fuel delivery to exhaust pipe $16_1$, piston valve 45 is moved to the right and opens the port to return conduit 16 more widely.

Starting from main $20_3$ towards the fuel injection nozzles or jets 22 is a fuel conduit $6_5$ which branches into two conduits $6_3$ and $6_4$. Conduit $6_4$ is unobstructed and secures a minimum fuel supply to nozzles 22.

Inserted in conduit $6_3$ is a valve device comprising a valve body $50_1$ in which a fuel passage control piston 50 is biassed to cut-off position by a spring 51 and is further subjected to fuel pressure in the portion of conduit $6_3$ located downstream, through a pipe $50_2$. The object of this valve is to maintain a sufficient pressure of fuel in conduit $6_5$.

(c) *Actuating means for the fuel feed control means*

(1.) CONTROL AS A FUNCTION OF PRESSURE

Piston valve 21 in the fuel feed control device 17 is actuated by two different operating devices.

An operating device as a function of the pressure prevailing at the inlet of compressor 1. This device includes an air intake pipe 24 connected by a conduit 29 with a reservoir 52 containing evacuated capsules 53, 54 mounted on two rods $38_1$ and $38_2$.

Longitudinally spaced-apart on rod $38_2$ and fast therewith are slide valve elements $26_1$, $26_2$, $26_3$, $26_4$ providing passages therebetween for a control fluid such as oil, the composite slide valve being movably arranged in an open-ended cylinder 26 as shown; pressure oil is fed to cylinder 26 from a pump 32 via a pipe 33. Starting from cylinder 26 are two oil pipes 30, 31, the oil delivery to which is controlled by valve elements 26₂ and 26₃, respectively; pipes 30 and 31 lead to the inner spaces on either side of a piston 27 in a cylinder 56. Fast with piston 27 is a rod 27₁ which is coupled with a rod 57 fast with piston valve 21, through a lever 28 pivotally connected with both rods; rotatably supported on lever 28 is a roller 58 arrangd to move on a stationary surface 58₁.

An oil discharge pipe 59 having a spring urged check valve 60 therein is connected with pipe 33 for return of excess oil from pump 32.

In conduit 31 from cylinder 26 to cylinder 56 is inserted a valve device, which comprises a slidable member 43 including two spaced-apart pistons 61, 62, said member being movably arranged in a cylinder 43₁; pistons 61, 62 are adapted to control the oil flow through conduit 31. The slidable member 43 is arranged to be moved by a centrifugal governor 42 driven from turbine 3, against the opposing force of a spring 44.

The rod 38₁ integral with pressure capsules 53, 54 is provided with a return spring 64 and its outer end lies in abutment relationship with a lever 36; at an end thereof, lever 36 is pivotally connected with rod 57 of piston valve 21, and at the opposite end lever 36 is connected with a temperature responsive control device to be described below, the point of contact between lever 36 and rod 38₁ lying between said ends.

(2.) CONTROL AS A FUNCTION OF TEMPERATURE

A reservoir 66 containing a heat expansible member 34 of which deformations measure the variations of temperature, is connected by a conduit 39 with conduit 29 from air intake pipe 24, and by a conduit 41 with an air vent nozzle 40 placed in front of the compressor 1.

The air entering pipe 24 reaches reservoir 66 through conduits 29 and 39 and gets out of this reservoir through conduit 41 and nozzle 40.

The heat expansible member 34 has an integral side arm on which is a pivot pin 35 arranged to move in a longitudinal slide 36₁ in lever 36.

The control means described above under 1 and 2 operate as follows:

The variations of air temperature at the inlet of compressor 1 cause deformations of the heat expansible member 34 and hence displacements of pivot pin 35 for lever 36.

The variations of air pressure at the inlet of compressor 1 cause deformations of pressure capsules 53, 54 which are pneumatic control means producing: a displacement of rod 38₂, as a result thereof a displacement of slide valve elements 26₁—26₄.

By reason of the displacement of slide valve elements 26₁—26₄, the supply of oil to cylinder 56 is altered so that piston 27 moves therein and lever 28, being thus rocked, moves piston valve 21 through rod 57 until said piston valve 21 reaches a new position corresponding to the air pressure which prevails; meanwhile, piston valve 21 in being so moved, causes lever 36 to swing and consequently to shift rods 38₁, 38₂ to a position for which slide valve elements 26₁—26₄ cut off further supply of oil to cylinder 56.

The position shown on the drawing for lever 36 corresponds to a limit case (which will not occur in practice) wherein the air pressure before compressor 1 is substantially equal to zero and, as a consequence, the control means cause only the fuel amount b as referred to in the opening statements of this specification to the combustion chamber. In all operation conditions, piston valve 21 and the lower end of lever 36 which engages rod 57 of said piston valve are shifted to the right to a variable extent. If from such a position, pivot pin 35 is raised as a result of an increase in air temperature before compressor 1, the point on lever 36 where rod 38₁ abuts is moved to the right and if air pressure has not altered meanwhile, that is to say if the axial length of capsules 53, 54 has remained unaltered, rods 38₁, 38₂ and hence slide valve elements 26₁—26₄ are shifted to the right. Consequently oil from pipe 33 is forwarded via the space in cylinder 26 between valve elements 26₂, 26₃, into conduit 31 and thence into cylinder 56; piston 27 is thus moved to the right, causing link 28 to swing about roller 58 and consequently to move piston valve 21 to the left through the stem 57 thereof, until the clockwise swinging of lever 36 about pivot pin 35 allows rods 38₁, 38₂ moved to the left by spring 64, to bring slide valve elements 26₂, 26₃ to oil cut-off position.

While slide valve elements 26₁—26₄ are moved as a result of pressure and/or temperature alterations, the valve device 43 inserted in conduit 31 from cylinder 26 to cylinder 56 is maintained by spring 44 in such a position as to allow a free passageway for oil through conduit 31.

(d) Speed governor

The speed governor 42 is a safety device which only is effective to move valve device 43 only when the number of revolutions of the motor exceeds a given limit. At this time only the speed governor moves valve device 43 against the opposing force of spring 44, and the piston valves 61, 62 of valve device 43 cause such an alteration in the flow of oil through conduit 30, 31 to cylinder 56 that the displacement of piston 27 results in a restriction of the fuel supply through apparatus 17 to nozzles 22 via conduits 63 and 64, irrespectively of the position of slide valve elements 26₁—26₄.

The amount of fuel fed through apparatus 17 to nozzles 22 thus depends on the pressure and temperature of the air at inlet of compressor 1.

By moving valve 7 through handle 9 therefor, the flow through orifice 8 and consequently the feed to apparatus 17 can be reduced, resulting in a decrease of the power output of the engine.

The control means according to this invention can also be used as above stated in the case where the propulsion means are adjustable.

The control means above described permit to obtain many technical advantages and notably the following:

1. The control means according to this invention enable of adjusting the fuel supply as a function of the variations of air temperature and pressure prevailing at the entrance of compressor 1, that is all the static characteristics of outside air, and at the same time the altitude and flight speed of the plane are taken into account automatically and accurately.

2. The control means comprise a fuel distributor which is so constructed that the amount of fuel supplied to the injection nozzle varies linearly with the stroke of the adjusting member therein. As a consequence the air pressure and air temperature responsive elements which actuate said adjusting member through a movement amplifier may be constructed as simple elements with a linear characteristic, and complicated transmission members such as cams with quadratic contours can be dispensed with.

3. The control means can be easily adapted to the different types of turbojet and turboprop engines and fuel injection nozzles.

4. In many cases, the control means according to this invention permit to employ a fixed exhaust nozzle.

What we claim is:

1. For turbojet and turboprop power units having an air compressor and a fuel burner, the combination of a temperature-responsive device adapted to be exposed to the air on the inlet side of said compressor; a separate pressure-responsive device adapted to be exposed to the air on the inlet side of said compressor; a source of fuel; a valve casing having a fuel inlet slot therethrough; a valve supported in said valve casing for movement along said slot, adapted to divide the inner space of said casing into two compartments of variable volumes communicating respectively with the portions of said slot on either side of said valve; means for supplying fuel from said source into said valve casing through said slot; means for conveying fuel from one of said compartments in said valve casing to said burner; means providing an exit for fuel from the other compartment; and means connected with said pressure-responsive device and said temperature-responsive device, for moving said valve in said valve casing according to a predetermined function of air temperature and air pressure variations.

2. For turbojet and turboprop power units having an air compressor and a fuel burner, the combination of a temperature-responsive device adapted to be exposed to the air on the inlet side of said compressor; a pressure-responsive device adapted to be exposed to the air on the inlet side of said compressor; means for conveying fuel from said source to said burner; means in said fuel conveying means, providing a fuel passage of variable cross-section, for controlling the flow therethrough of the total amount of fuel conveyed to the burner; and an operative connection between said temperature- and pressure-responsive devices and said fuel flow control means, for causing said fuel flow control means to alter said cross-section according to a predetermined function of air temperature and air pressure variations; said fuel conveying means comprising a first, unobstructed fuel pipe from said fuel flow control means adapted to be connected to said burner, a second fuel pipe from said first pipe adapted to be connected to said burner, a biassed-to-closure, throttling valve in said second fuel pipe, and means sensitive to fuel pressure differential upstream and downstream with respect to said throttling valve for controlling said throttling valve.

3. For turbojet and turboprop power units having an air compressor and a fuel burner, the combination of a source of pressure fuel; means for conveying fuel from said source to said burner, comprising a variable area fuel-metering orifice; a temperature-responsive device adapted to be exposed to the air on the inlet side of said compressor; a separate pressure-responsive device adapted to be exposed to the air on the inlet side of said compressor; a movable member adapted and arranged to vary the effective area of said fuel-metering orifice; an operative connection between said temperature- and pressure-responsive devices and said movable member, for so varying the position of said movable member in response to temperature and pressure changes as to keep a fuel flow B through said orifice, approximately defined by the formula $$B = \beta_{p_1}[1 + \tau(288 - T_1)] + b$$

wherein $\beta$ is the theoretical amount of fuel delivered to the burner at full throttle run in the case where the pressure at the inlet side of the compressor is normal atmospheric pressure and the air temperature at said inlet is 288° K., $p_1$ is the pressure at the inlet side of the compressor, $\tau$ is a constant, $T_1$ is the temperature at said inlet side measured in degrees K., and $b$ is the amount of unburnt fuel; and means for discharging fuel from said fuel conveying means in response to fuel pressure differential across said fuel metering orifice.

4. The combination of claim 3, further comprising a flow restricting device in said fuel conveying means between said fuel pressure source and said fuel metering means, comprising a hand-controlled valve; and means for discharging fuel from said fuel conveying means to said fuel metering orifice in response to fuel pressure differential across said flow restricting device.

5. The combination of claim 4, the last-named means comprising means providing an exit for fuel at a point in said fuel conveying means between said source and said hand-controlled valve, and means in said exit means sensitive to fuel pressure differential in said fuel conveying means upstream and downstream with respect to said hand-controlled valve, for controlling the discharge of fuel through said exit means.

6. The combination of claim 3, said pressure-responsive device comprising an evacuated capsule so as to be substantially irresponsive to air temperature variations.

7. The combination of claim 3, said fuel conveying means comprising a pair of fuel pipes to receive the fuel effluent from said fuel-metering orifice and convey the same to said burner, one of said pipes being unobstructed; a biassed-to-closure, throttling valve in the other fuel pipe; and means sensitive to fuel pressure differential upstream and downstream with respect to said throttling valve for controlling the same.

HERMANN OESTRICH.
SIEGFRIED DECHER.
WOLFGANG STEIN.

References Cited in the file of this patent

UNITED STATES PATENTS

| Number | Name | Date |
|---|---|---|
| 2,305,070 | Butler et al. | Dec. 15, 1942 |
| 2,422,808 | Stokes | June 24, 1947 |
| 2,426,740 | Mock | Sept. 2, 1947 |
| 2,457,595 | Orr | Dec. 28, 1948 |
| 2,531,780 | Mock | Nov. 28, 1950 |

FOREIGN PATENTS

| Number | Country | Date |
|---|---|---|
| 603,884 | Great Britain | June 24, 1948 |